Sept. 28, 1926.
W. B. STONE
1,601,704
MATERIAL RETAINING DEVICE FOR STORAGE BATTERIES
Filed Jan. 20, 1926
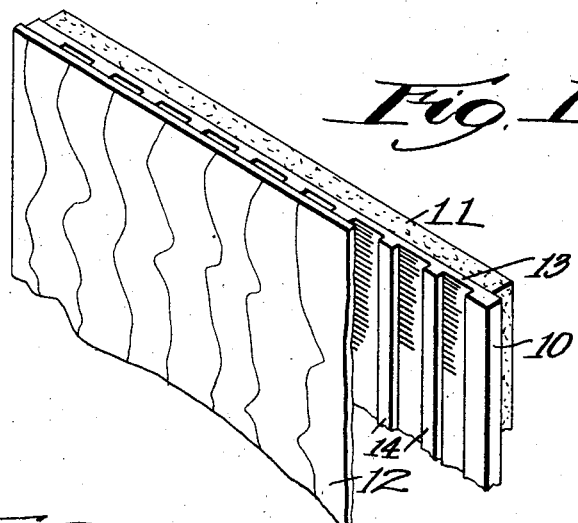
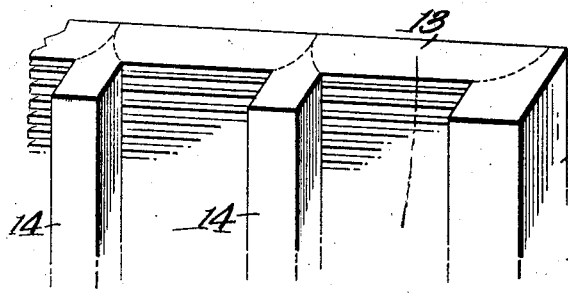
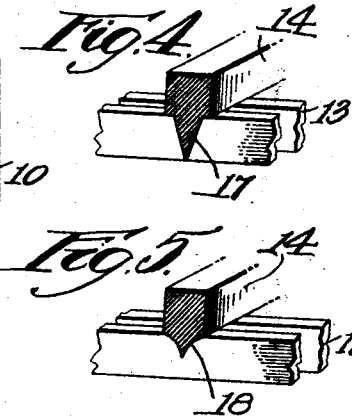
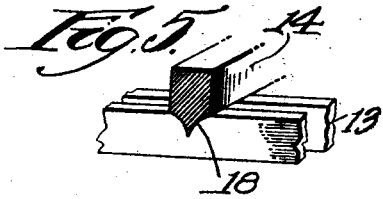
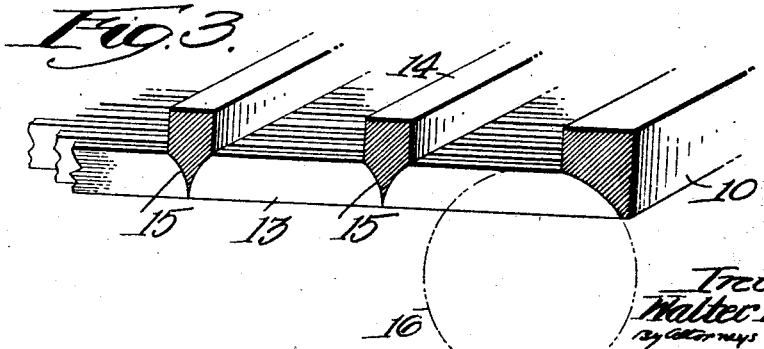

Patented Sept. 28, 1926.

1,601,704

UNITED STATES PATENT OFFICE.

WALTER B. STONE, OF WEBSTER, MASSACHUSETTS, ASSIGNOR TO THE ELECTRIC STORAGE BATTERY COMPANY, OF PHILADELPHIA, PENNSYLVANIA, A CORPORATION OF NEW JERSEY.

MATERIAL-RETAINING DEVICE FOR STORAGE BATTERIES.

Application filed January 20, 1926. Serial No. 82,585.

This invention relates to a material retaining device for a storage battery said device being of the general type shown in my prior Patent, No. 1,492,816, issued to me May 6, 1924, but my present invention differs in many important respects from the construction therein shown.

Such material retaining devices are designed to support the active material in the grids or conducting elements of a storage battery. At the same time, they should afford a free and non-obstructed passage for the electrolyte to the active material in the grids, and they must be of sufficient strength to prevent displacement of parts or breakage in handling or service.

It is the general object of my invention to improve the construction shown in my prior patent by providing increased material and strength at the points where the reinforcing ribs are applied to the plate and I accomplish this desirable result without substantially reducing the open area in which free access of the electrolyte to the active material is afforded.

My invention further relates to certain arrangements and combination of parts which will be hereinafter described and more particularly pointed out in the appended claims.

A preferred form of my invention is shown in the drawings in which:

Fig. 1 is the perspective view showing a portion of my improved material retaining device assembled with the other elements forming a portion of a storage battery cell.

Fig. 2 is the partial detail perspective view of one of the material retaining devices;

Fig. 3 is an enlarged detail perspective view of a portion of my improved device, and indicates also a method by which the same may be conveniently constructed; and Figs. 4 and 5 are similar views showing modifications.

Referring to Fig. 1, I have shown my improved retaining device 10 assembled with a grid or conducting element 11 and a wooden plate or diaphragm 12. The grid 11 and diaphragm 12 are of the usual construction and form no part of my present invention and form no part of my present invention, which relates to the specific structure of the retaining device 10.

My improved retaining device is formed from a blank having a continuous surface or body portion 13 forming one side of the device and having a plurality of reinforcing ribs 14 disposed at the opposite side of the device. The body portion 13 is provided between each pair of ribs 14 with a large number of narrow and closely adjacent slots through which the electrolyte may freely circulate yet preventing erosion of the active material.

In my prior patent, these slots were continuous from edge to edge of the device, but in my present construction the slots between the different pairs of ribs are wholly or partially separated by portions of material 15. These portions of material are preferably substantially triangular in shape, with the base of the triangle disposed against the inner face of the corresponding rib 14 and of substantially equal width, and with the apex of the triangle substantially at the opposite outer surface of the retaining device.

Retaining devices constructed as above described may be conveniently manufactured by sawing the slots between the successive pairs of ribs with a gang of small cutters as indicated in dotted lines at 16 in Fig. 3. These cutters may be given limited travel lengthwise of the slots and the device may be lifted away from the cutters at the ends of the limited travel to leave undisturbed the material 15 indicated in Fig. 3. The relative movements of the retaining device and the saws may obviously be reversed in accomplishing the same result.

When thus constructed, the inclined faces of the reinforcing material 15 will be slightly concave to correspond to the periphery of the saws. While the device may be conveniently constructed by sawing the slots as above described, my invention is not limited to a particular method of forming the slots and the slots may be molded, stamped or slitted instead of sawed or they may be formed by a combination of these processes. The reinforcing material may be somewhat reduced in cross section as indicated at 17 in Fig. 4 or at 18 in Fig. 5, and in Fig. 5 it will be noted that the reinforcing material extends only partially across the thickness of the body 13 of the retaining device.

In each form, however, it will be evident that the strength of the ribs 14 has been materially increased and that I have accomplished this result while at the same time leaving substantially the entire outer surface free and open to permit contact of the electrolyte with the active material in the grid 11. This change in construction is of importance as it very materially increases the strength and durability of the retaining device and reduces the liability of breakage thereof, particularly in handling when assembling or when removed from the battery.

Having thus described my invention and the advantages thereof, I do not wish to be limited to the details herein disclosed, otherwise than as set forth in the claims, but what I claim is:—

1. A material retaining device for a storage battery, said device having parallel reinforcing ribs formed on one face thereof, and said device being provided with a large number of narrow, closely adjacent slots between said ribs and having the pairs of longitudinally adjacent slots separated at the interposed ribs by portions of non-slotted material of approximately triangular cross section, with the base of said material against said rib and with its apex projecting toward the outer face of said retaining device.

2. A material retaining device for a storage battery, said device having parallel reinforcing ribs formed on one face thereof, said device being provided with a large number of narrow, closely adjacent slots between said ribs and having the pairs of longitudinally adjacent slots separated at the interposed ribs by portions of non-slotted material of approximately triangular cross section, with the base of said material against said rib and the apex substantially in the plane of the outer face of said retaining device.

3. A material retaining device for a storage battery, said device having parallel reinforcing ribs formed on one face thereof, said device being provided with a large number of narrow, closely adjacent slots between said ribs and having the pairs of longitudinally adjacent slots separated at the interposed ribs by portions of non-slotted material of approximately triangular cross section, the base of said reinforcing material being disposed against said rib and being of substantially the same width and the apex of said material being approximately in the plane of the opposite face of said retaining device.

4. A material retaining device for a storage battery, said device having parallel reinforcing ribs formed on one face thereof, said device being provided with a large number of narrow, closely adjacent slots between said ribs and having the pairs of longitudinally adjacent slots separated at the interposed ribs by portions of non-slotted material of approximately triangular cross section, with the base of said material against said rib and its apex substantially in the plane of outer face of said retaining device, the inclined faces of said reinforcing material being concave between the base and apex of the triangular cross section thereof.

In testimony whereof I have hereunto affixed my signature.

WALTER B. STONE.